Nov. 3, 1964   F. R. SCHWENZER   3,155,384
WORK HOLDER
Filed July 2, 1963
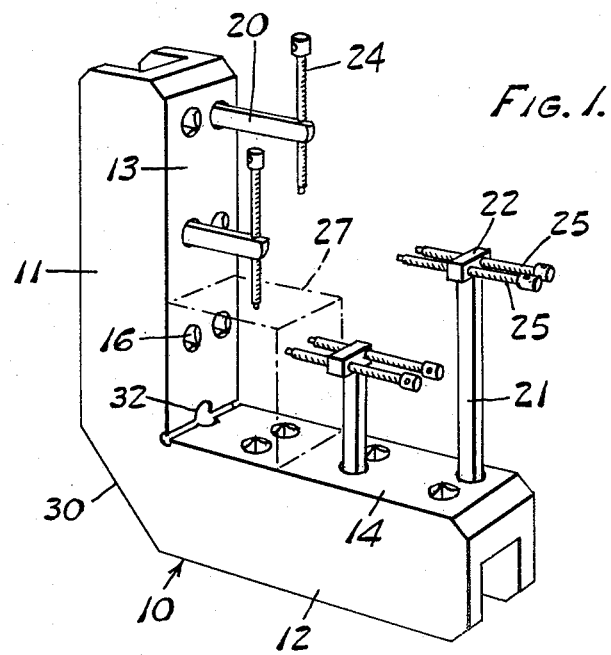
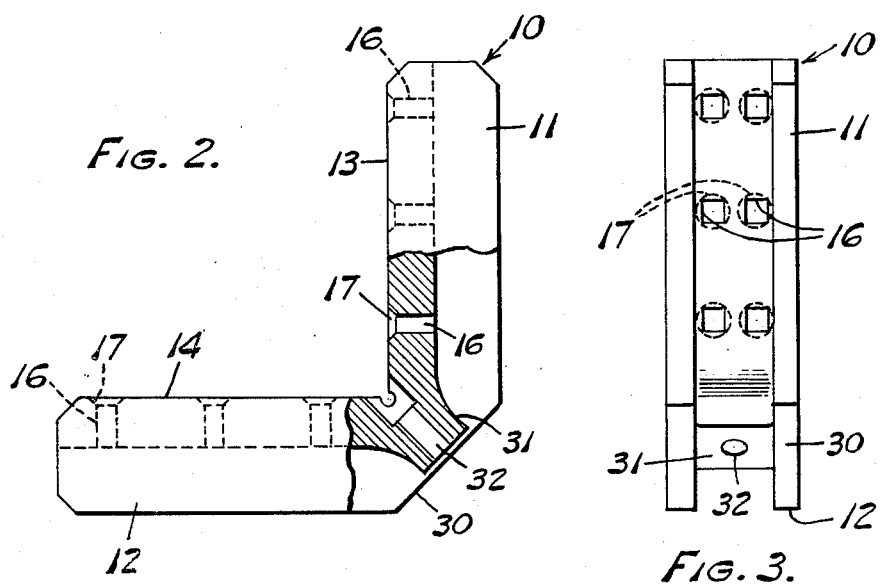
INVENTOR.
Francis Raymond Schwenzer
BY
Christel & Bean
ATTORNEYS

3,155,384
WORK HOLDER
Francis Raymond Schwenzer, Buffalo, N.Y., assignor to Schwenzer Tool and Die Co., Inc., Buffalo, N.Y.
Filed July 2, 1963, Ser. No. 292,256
1 Claim. (Cl. 269—101)

This invention relates to work holding devices and particularly to fixtures for holding work pieces of various shapes in position for machining, grinding, laying out, checking and other fabricating operations.

Various vises and clamping devices have previously been proposed for securing work pieces in position for performing machine operations thereon and for other purposes. The fixture of the present invention accomplishes these general purposes by means of a device which is simple and rugged in construction and one which may be manufactured economically. Further, the device of the present invention admits of highly precise manufacture without complex manufacturing operations.

An important advantage of the work holding fixture of the present invention resides in the flexibility and ease of use and the wide range of sizes and shapes of parts or work pieces which may readily be accommodated therein. The foregoing and other objects and advantages will become apparent to those skilled in the metal working arts from a consideration of the representative embodiment illustrated in the accompanying drawing and described in detail in the following specification.

While a typical embodiment of the present invention is illustrated and described herein by way of example, it is to be understood that the present invention is not limited thereto, nor otherwise than as defined in the appended claims.

In the drawing:

FIG. 1 is a perspective view of one form of the work holding fixture of the present invention;

FIG. 2 is a side elevational view of the main body member of the fixture of FIG. 1 with portions broken away for added illustration; and FIG. 3 is an end elevational view thereof.

Like characters of reference denote like parts in the several figures of the drawing and the numeral 10 designates generally a body member comrpising a pair of legs 11 and 12 which extend to form a right angle. In the form illustrated herein by way of example each leg is of channel-shaped cross section and the several external surfaces, including the surfaces designated 13 and 14 in FIG. 1, are precision ground for accurate parallelism and relative angularity.

A prime consideration in the fixture of the present invention resides in providing work engaging devices for clamping work in the angle formed by the legs 11 and 12 in such a way that work of various shapes and sizes may readily be clamped without substantial adjustment operations. To this end work pieces engaging screws and mounting devices therefor are provided which are positioned by extremely simple manipulation in such a way that the screws engage and clamp the work in a most effective manner.

The web portions of the legs 11 and 12 are provided with square holes 16 which extend at right angles to the precision surfaces 13 and 14 which comprise the work receiving surfaces of the fixture. As shown in the drawings, the several square holes 16 have circular countersinks 17 at their junctures with the surfaces 13 and 14 to permit ready entry of square shanks thereinto, as will presently appear.

Various forms of adjustable clamping devices may be employed within the intent of the present invention and by way of example, FIG. 1 illustrates an adjustable clamp member 20 comprising a straight square shank and another adjustable clamp member 21 which likewise comprises a straight square shank but with a T-bar 22 at the outer end. The clamp 20 is transversely threaded at its outer end to receive a clamp screw 24 whereas the T-bar 22 of the clamp member 21 is provided with two threaded openings for receiving a pair of clamp screws 25. Various numbers and combinations of the clamp devices 20 and 21 may be employed as desired for work pieces of various sizes and shapes.

The shank of a clamp member 20 or 21 is slid into any desired opening 16 of the body member 10 to any desired depth whereby the screw 24 or the screws 25 are positioned at any desired distance from the surfaces 13 and 14. No further adjustment or fixing of the positions of the shanks of the clamp members 20 and 21 is required since they fit fairly closely in the square holes 16 and the clamping action of the screws 24 or 25 against a work piece securely binds the shanks against any shifting of position lengthwise in the holes 16.

Merely by way of example, a rectangular work piece is indicated in dot and dash lines at 27 in FIG. 1 with a pair of the clamping devices securing the same firmly and accurately against the surfaces 13 and 14. Work pieces of any configuration whether round or of other irregular shapes may be secured in a similar manner which will be obvious to those skilled in the machinist arts.

The body member 10 with a work piece secured in its internal angle, as generally illustrated in FIG. 1, may be placed upon a work surface such as the bed or work table of a machine tool or on a surface plate or the like in any of various positions. Perhaps most commonly the body member 10 will be disposed with one of its side surfaces flat against the work table or surface plate although the same may also be disposed in the position shown in FIG. 1.

With a side surface placed flat upon a work table the lower flanges of the channels which form legs 11 and 12 may be secured to the work table by means of T-bolts or other clamping devices. Furthermore, in this position or in various other positions which the fixture may assume, attachment thereof may be by magnetic chuck means which are well known in this art.

In the present embodiment the external angle formed by the legs 11 and 12 is cut off at 45° to form surfaces designated 30 upon which the fixture may be disposed so that its internal angle opens upwardly. In this connection, the web portions of the channels forming the legs 11 and 12 merge in an enlargement designated 31 in FIG. 2. A bolt or screw hole 32 in enlargement 31 is perpendicular to the surface 30 and facilitates securing the fixture in this 45° position by means of a bolt or screw through the hole 32.

I claim:

In a work holding fixture, a body member comprising a pair of leg members having adjacent surfaces lying in planes disposed at right angles to each other, a plurality of openings extending perpendicularly through said leg members from each of said surfaces, and a plurality of clamp members having shank portions slidably interchangeably engageable in said openings, each of said clamp members having a clamp screw threaded therethrough at an end thereof and directed perpendicularly toward the other of said adjacent surfaces, said body member having an obliquely disposed flat support surface at the apex of the external angle formed by said leg members and a screw hole extending through said body member perpendicular to said oblique support surface.

References Cited by the Examiner

UNITED STATES PATENTS

| 1,954,708 | 4/34 | Mass | 269—152 X |
| 2,669,013 | 2/54 | Wilson | 269—152 X |

FRANK SUSKO, *Primary Examiner.*

ROBERT C. RIORDON, *Examiner.*